United States Patent [19]

Kanamaru

[11] Patent Number: 4,860,122
[45] Date of Patent: Aug. 22, 1989

[54] DEVICE FOR REPRODUCING A SEQUENCE OF STILL PICTURES WITH AN AUDIO PORTION AND WITHOUT MOTION PICTURES BETWEEN SUCCESSIVE STILL PICTURES

[75] Inventor: Hitoshi Kanamaru, Saitama, Japan

[73] Assignee: Pioneer Electronic Corporation, Tokyo, Japan

[21] Appl. No.: 161,053

[22] Filed: Feb. 26, 1988

[30] Foreign Application Priority Data

Feb. 26, 1987 [JP] Japan ................................. 62-43685
Feb. 26, 1987 [JP] Japan ................................. 62-43686

[51] Int. Cl.⁴ ........................... G11B 7/00; H04N 5/76
[52] U.S. Cl. ................................. 358/341; 358/342; 360/19.1; 360/35.1
[58] Field of Search ............... 358/335, 342, 341, 343, 358/909; 369/34, 36, 53–57, 32; 360/19.1, 35.1, 71, 72.1, 72.2

[56] References Cited

U.S. PATENT DOCUMENTS 4,490,747 12/1984 Yokoyama ........................ 360/72.1
4,635,136 1/1987 Ciampa et al. ....................... 358/342
4,672,471 6/1987 Gouda ............................. 358/342 X
4,675,755 6/1987 Baumeister et al. ............... 360/35.1

*Primary Examiner*—Robert L. Richardson
*Attorney, Agent, or Firm*—Sughrue, Mion, Zinn, Macpeak & Seas

[57] ABSTRACT

An audio still picture reproducer in which picture numbers corresponding to desired pictures which are to be reproduced from a recording medium are entered at a keypad or the like and sequentially stored, prior to reproduction, in a memory in accordance with the sequence of the reproduction of the desired pictures. During reproduction, video information read from the recording medium and corresponding to the picture numbers stored in the memory is written in a video memory in accordance with the sequence of the storage of the picture numbers in the memory. The video information written in the video memory is sequentially and repeatedly read from the video memory and supplied as reproduced video information to a monitor to produce a still picture. Audio information read from the recording medium is reproduced as is.

17 Claims, 3 Drawing Sheets

DEVICE FOR REPRODUCING A SEQUENCE OF STILL PICTURES WITH AN AUDIO PORTION AND WITHOUT MOTION PICTURES BETWEEN SUCCESSIVE STILL PICTURES

BACKGROUND OF THE INVENTION

The present invention relates to a device for reproducing recorded information, which device is capable of reproducing a still picture with corresponding audio information.

In a method disclosed in Japanese Patent Application No. 197619/86 filed on behalf of the present applicant, a video memory capable of storing video information obtained from a recording medium, for example, a video disk is disclosed. The quantity of video information stored on the disk corresponds to at least one video field. Audio information read from the video disk is sequentially sent out as reproduced audio information, and video information corresponding to a prescribed picture is written in the video memory. The video information written in the video memory is repeatedly read therefrom and sent out as reproduced video information, so that a still picture having an audio portion is reproduced.

FIG. 1 shows a block diagram of a recorded information reproducer for implementing such a method. In the recorded information reproducer, a video disk 1 is rotated by a spindle motor 2 so that information recorded on the disk is read by an optical pickup (O.P.) 3, the output from which is amplified by a preamplifier 4. The audio component of the amplified output is demodulated by an audio demodulation circuit (A.D.C.) 5, and the output from the audio demodulation circuit is supplied to an audio output terminal 6. The video component of the amplified output is demodulated by a video demodulation circuit (V.D.C.) 7. The output of the video demodulation circuit is supplied to a video output terminal 9 through a video memory 8 which is a field memory or a frame memory. A writing clock signal generation circuit (W.C.S.G.C.) 10 generates a writing clock signal locked to the horizontal synchronizing signal or color burst signal, for example, included in a video signal which is the demodulated output from the video demodulation circuit 7, so that the timing of writing of the video information in the video memory 8 is controlled by the writing clock signal. The video information written in the video memory 8 is read therefrom depending on a reading clock signal generated by a reading clock signal generation circuit (R.C.S.G.C.) 11 synchronously with a reference signal generated by a reference signal generation circuit (R.S.G.C.) 12. The video information is written in the video memory 8 only while a writing command signal is supplied from a control circuit (not shown in the drawings) through an input terminal A.

While the writing command signal is supplied from the control circuit, the video information is written in the video memory 8 depending on the writing clock signal synchronized with the video signal. When the supply of the writing command signal is stopped, the writing of the video information in the video memory 8 is ceased. In contrast, the video information written in the video memory 8 is always read therefrom depending on the reading clock signal (of fixed frequency), regardless of whether the supply of the writing command signal is continuing or stopped. As a result, the video information read from the video memory 8 is continuously sent out as the reproduced video information to a monitor 13 through the video output terminal 9 so that a picture is displayed on the monitor.

The recorded information is read from the video disk 1 in a normal reproduction mode. If a viewer watching the display of the monitor 13 stops giving a writing command, at the time of appearance of a picture which the viewer wants to watch, the video information is thereafter not written in the video memory 8. Therefore, the video information last written in the video memory and corresponding to the picture which the viewer wants to watch is repeatedly read from the video memory. As a result, the picture is displayed as a still picture on the monitor 13. Since the reproduction of the video disk 1 remains in the normal reproduction mode, the audio information read from the video disk 1 is demodulated as is, so that the demodulated audio information is supplied as normal reproduced audio information to a loudspeaker 14 through the audio output terminal 6 and reproduced normally. If the writing command is given again, a moving picture is normally reproduced from the time of the giving of the writing command, thereby replacing the still picture. A special reproduction effect of switching to a still picture mode midway in the normal reproduction of the moving picture without interrupting the audio reproduction can thus be produced.

Although the still picture is reproduced by the reproducer when the writing command is stopped, the reproduction of the video disk continues throughout the reproduction of the still picture so that a next still picture which the viewer wants to watch cannot be displayed on the monitor. In order to reproduce the next still picture, the viewer needs to repeat the same procedure in which he gives the writing command to normally reproduce a moving picture and then stops giving the writing command while watching the moving picture, to replace the moving picture with the next still picture. For that reason, the still pictures and the moving pictures can only be alternately reproduced. Sequential reproduction of still pictures cannot be achieved. It is also difficult to reproduce a still picture of the exact frame of the video signal that is desired.

SUMMARY OF THE INVENTION

The present invention was achieved to overcome the above-mentioned problems.

It is an object of the present invention to provide an audio still picture reproducer capable of sequentially reproducing an optional number of desired still pictures with an audio portion.

It is another object of the present invention to provide an audio still picture reproducer in which picture numbers respectively corresponding to desired pictures, which are to be reproduced from a recording medium, are sequentially stored, before reproduction, in a memory means in accordance with the sequence of the reproduction of the pictures. Video information read from the recording medium and corresponding to the picture numbers stored in the memory means is written in a video memory in accordance with the sequence of the storage of the picture numbers in the memory means. The video information written in the video memory is sequentially and repeatedly read therefrom and used as reproduced video information, and audio information read from the recording medium is used as reproduced audio information as is.

It is still another object of the present invention to provide an audio still picture reproducer in which picture numbers corresponding to desired ones of pictures which are to be reproduced from a recording medium are stored, before reproduction, in a memory in correspondence with programs to which the desired pictures belong, respectively. When a desired program is selected, reproduced video information corresponding to the picture number stored in the memory and belonging to the selected program is written in a video memory. The reproduction of the selected program is thereafter started from a prescribed position, preferably from the beginning of the program. Video information written in the video memory is sequentially and repeatedly read therefrom and used as reproduced video information, and audio information read from the recording medium is used as reproduced audio information as is.

DETAILED DESCRIPTION OF THE PREFERRED EMBODIMENTS

Preferred embodiments of the present invention are hereafter described in detail with reference to the drawings attached hereto.

Figure 1:
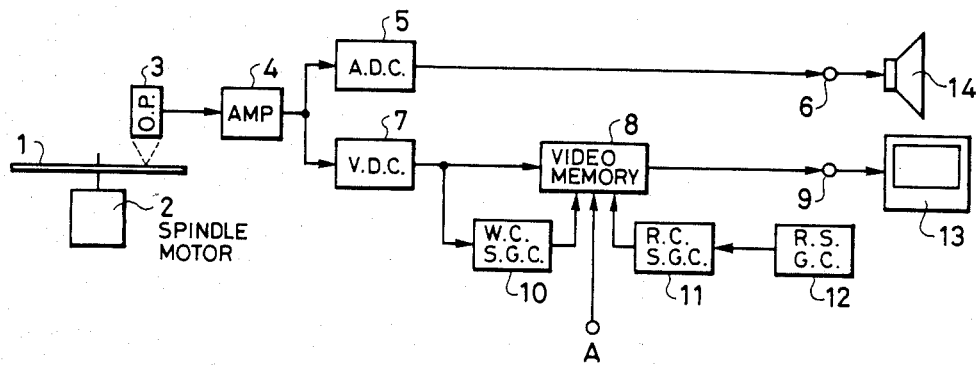
FIG. 1 shows a block diagram of a type of information reproducer to which the present invention is applicable.
Figure 2:
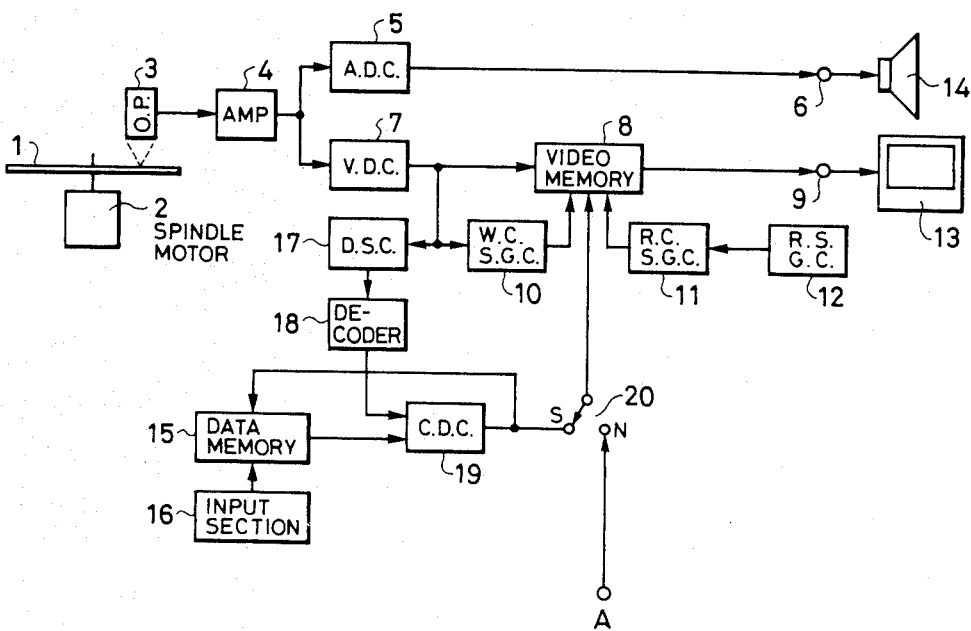
FIG. 2 shows a block diagram of an audio still picture reproducer according to a first embodiment of the present invention.

FIG. 2 shows a block diagram of an audio still picture reproducer according to a first embodiment of the invention. Elements which are shown in FIG. 2 that are also shown in FIG. 1 are denoted by the same reference symbols.

A video signal read from a video disk 1 includes data indicative of picture numbers such as frame numbers, which are on the reproduced pictures, respectively. The picture numbers serve as addresses for searching out and reproducing a desired picture. It should be noted that the picture numbers will correspond to different points of the continuously elapsing time during the reproduction of the video information.

A data memory 15 capable of storing an optional or desired cardinal number of the picture numbers is provided. Desired picture numbers, which correspond to desired pictures out of a series of pictures to be reproduced from the video disk 1, are entered as target picture numbers into the data memory 15 through an input section 16 (made of ten digit keys or the like), in accordance with the sequence of reproduction of the desired pictures. The entered picture numbers are stored at the first and the next following addresses in the data memory 15, in the sequence in which they are entered.

A video signal which is the demodulated output from a video demodulation circuit 7 is supplied to a data separation circuit 17 as well as to the video memory 8.

In the data separation circuit (D.S.C.) 17, data corresponding to the picture numbers is extracted out of the video signal. In a decoder 18, the extracted data is decoded into the picture numbers, and the picture numbers are then supplied to a coincidence detection circuit (C.D.C.) 19. The coincidence detection circuit 19 comprises a register for storing the target picture numbers supplied from the data memory 15, another register for storing the reproduced picture numbers obtained from the disk 1, and a coincidence circuit for monitoring the coincidence of the values of both the registers. The coincidence circuit also compares the target picture numbers and the reproduced picture numbers with each other so that when both the compared numbers have coincided with each other, the coincidence detection circuit 19 generates a writing command signal for a time corresponding to one field or one frame depending on whether a video memory 8 is a field memory or a frame memory. The writing command signal is supplied to the video memory 8 through a mode switch 20 when the switch is set to contact S, and the command signal is also feed back to the data memory 15. The feed back of the command signal controls the data memory 15 so that the data memory shifts from a data storage address to the next data storage address of larger number, after the completion of writing in the video memory. Because of this control, the next picture number is automatically sent out from the data memory 15 to the coincidence detection circuit 19. When the mode switch 20 is shifted to contact N, the audio still picture reproducer is put in the same reproduction mode as the audio still picture reproducer of FIG. 1. When the mode switch 20 is shifted to contact S, the audio still picture reproducer is put in a special reproduction mode in accordance with the present invention.

Next, the reproduction operation of the audio still picture reproducer will be described in detail. An optional number of picture numbers corresponding to desired pictures are first entered through the input section 16 in accordance with the sequence of reproduction of the desired pictures. The desired pictures are selected out of the series of picture numbers (which are attached to the video disk 1) to be reproduced, so that the selected picture numbers are stored in the data memory 15 before reproduction. The mode switch 20 is then shifted to the contact S and the reproduction of the video disk 1 is started. The audio information read from the video disk 1 is demodulated by the audio demodulation circuit 5 and sequentially supplied as reproduced audio information to loudspeaker 14 so that the audio information is normally reproduced. The video information read from the disk 1 is demodulated by the video demodulation circuit 7 and sequentially supplied to the video memory 8. Until the coincidence detection circuit 19 detects that the reproduced picture number obtained from the video signal coincides with the target picture number supplied from the data memory 15, the writing command signal is not supplied to the video memory 8. Therefore, the video information is not written in the video memory. When it is detected by the coincidence detection circuit 19 along with the progress of the reproduction that the reproduced picture number has coincided with the target picture number stored at the first address in the data memory 15, the writing command signal is sent out from the coincidence detection circuit to the video memory 8 so that the video information (having a quantity of one field or one frame) corresponding to the target picture number is written in the video memory. The video information written in the video memory is thereafter repeatedly read therefrom and sent out as reproduced video information so that a still picture is continuously displayed on the monitor 13. When the writing command signal is no longer being sent out from the coincidence detection circuit 19, namely, when the writing of the video information in the video memory 8 is completed, processing is shifted from the data storage address in the data memory 15 to the next data storage address of larger number therein. Due to this shift, the next target picture number is sent out to the coincidence detection circuit 19 to wait for the next (second) desired picture to appear on the monitor 13.

When a reproduced picture number coincides with the second target picture number, the coincidence detection circuit 19 sends out the writing command signal again so that video information corresponding to the second desired picture is written in the video memory 8. When the writing of the video information in the video memory 8 is completed, the supply of the writing command signal is stopped so that processing is shifted from the data storage address in the data memory 15 to the (third) data storage address (of larger number) following the second address. In the meantime, the second desired picture is continuously displayed as a still picture on the monitor 13. With such a system, if the first picture number attached to the disk 1 is stored as the first address in the data memory 15 beforehand, still pictures can be sequentially displayed from the first one to the last one on the monitor 13.

The above-described cycle of the reproduction operation is thus repeated a number of times which is equal to the number of the target picture numbers stored in the data memory 15, so that the number of the desired still pictures are sequentially displayed on the monitor 13. Since the reproduction of the video disk 1 is normally performed from the beginning to the end, the audio information is continuously reproduced, as normal, by the loudspeaker 14.

Although the target picture numbers corresponding to the desired pictures are entered through the input section 16 in accordance with the sequence of the reproduction of the desired pictures, and are thus stored in the data memory 15 in the above-described embodiment, the most preferable procedure of storing the desired picture numbers in the data memory is that a viewer gives a storage command for each desired picture during a preview reproduction of a moving picture on the monitor 13 as the video disk 1 is reproduced before the viewing in which the desired pictures are to be reproduced. When the viewer gives the storage command, the displayed picture will be stored by its picture number included in the corresponding video information.

Figure 3:
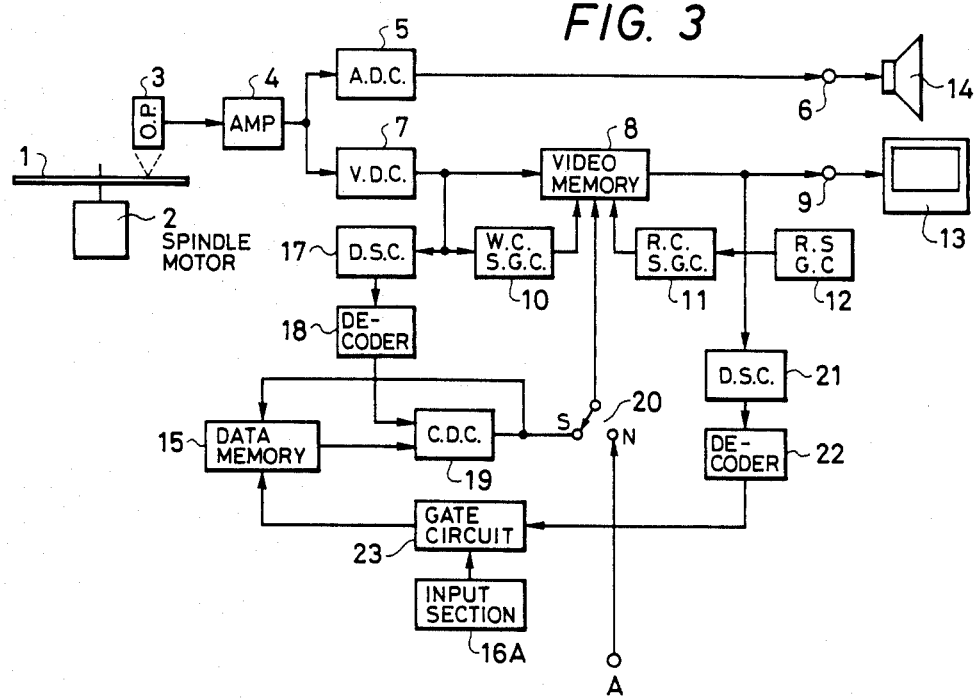
FIG. 3 shows a block diagram of an audio still picture reproducer according to a second embodiment of the present invention.

FIG. 3 shows an audio still picture reproducer according to a second embodiment of the present invention. In the second embodiment, the above-mentioned most preferable procedure is applied. The audio still picture reproducer includes another data separation circuit (D.S.C.) 21 in which data corresponding to picture numbers is extracted out of a video signal sent out from a video memory 8, another decoder 22 for decoding the extracted data into the picture numbers, and a gate circuit 23. The gate circuit 23 functions so that each of the picture numbers from the decoder are supplied to a data memory 15 in response to a storage command. These components are provided in addition to the same components as those of the audio still picture reproducer shown in FIG. 2. The data separation circuit 21 and the decoder 22 may be replaced by the data separation circuit 17 and decoder 18, respectively, by additionally coupling the output from the decoder 18 into the gate circuit 23.

The reproduction operation of the audio still picture reproducer shown in FIG. 3 will now be described. Mode switch 20 is first shifted to contact N so that normal reproduction is started. A moving picture is thus displayed on a monitor 13 and the viewer watches the moving picture. When a desired picture is displayed on the monitor 13, the storage command is given (by the viewer) through an input section 16A. As a result, the gate circuit 23 is turned on so that the picture number corresponding to the desired picture is stored as a target picture number in the data memory 15. When another desired picture is displayed on the monitor 13, the viewer issues another storage command. An optional number of target picture numbers are thus sequentially stored in the data memory 15 in accordance with the sequence of the reproduction of the desired pictures. At that time, either undesired pictures may be skipped by a quick motion or the like to search out each desired picture, or a step-by-step reproduction mode or a still picture reproduction mode may be set to precisely search out each desired picture, to store each target picture number.

If the mode switch 20 is shifted to contact S after the storage of the target picture numbers in the data memory 15 to normally reproduce a video disk 1 from the beginning thereof, the special reproduction mode in which audio still pictures are sequentially reproduced in the same manner as in the first embodiment is performed.

Although the writing of the video information in the video memory 8 is performed by use of hardware (the data memory 15 and the coincidence detection circuit 19) in each of the above-described embodiments, the writing may be performed using software by using a microcomputer.

Figure 4:
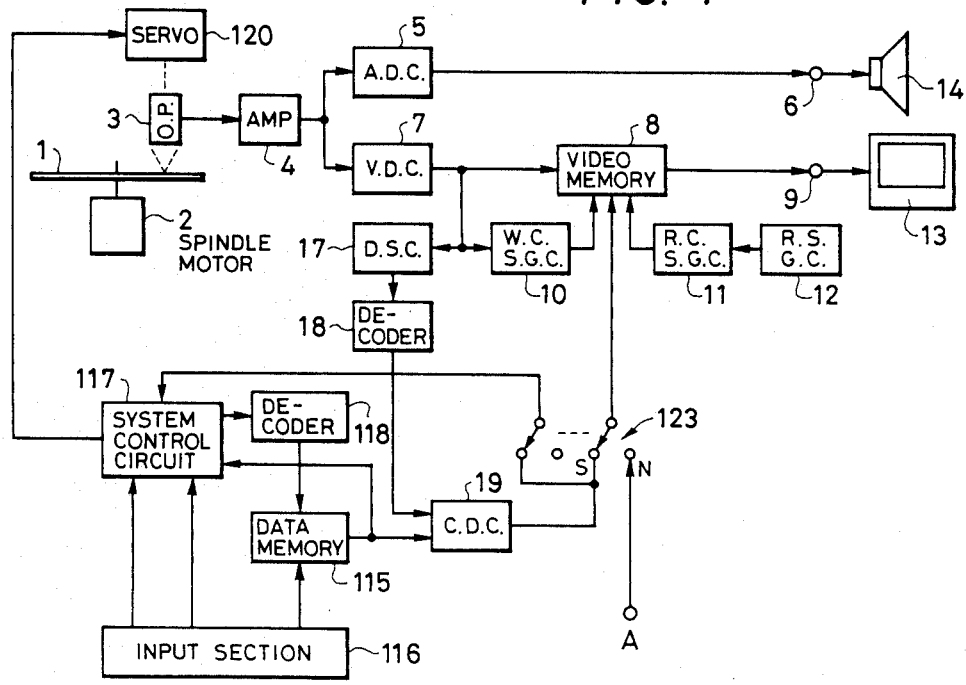
FIG. 4 shows a block diagram of an audio still picture reproducer according to a third embodiment of the present invention.

FIG. 4 shows a block diagram of an audio still picture reproducer according to a third embodiment of the present invention. The mutually corresponding portions shown in FIGS. 1, 2 and 4 are denoted by the same reference symbols therein.

In the audio still picture reproducer, as described above, a video signal read from a video disk 1 has portions indicative of picture numbers such as frame numbers, which are attached to reproduced pictures, respectively. The picture numbers serve as addresses so that a selected picture can be searched out and reproduced. A data memory 115 capable of storing an optional number of the picture numbers is provided. A program number such as the number of a chapter desired to be reproduced in still picture reproduction is entered through an input section 116 and supplied to a system control circuit 117 such as a microcomputer. When a program search command is given through the input section 116, the system control circuit 117 supplies the entered program number to yet another decoder 118 and performs a control function described hereinafter. The decoder 118 deciphers an address present in the data memory 115 and corresponding to the program number so that a target picture number stored at that address in the data memory is read therefrom and supplied to the system control circuit 117 and coincidence detection circuit 19. The system control circuit 117 then controls a servo mechanism 120 (for controlling the position of pickup 3) to move the information reading point (light spot) of the pickup 3 to the position corresponding to that address and thereafter start the reproduction of the video disk 1 therefrom.

A video signal which is the demodulated output from video demodulation circuit 7 is supplied to data separation circuit 17 as well. In the data separation circuit 17, data corresponding to the picture numbers is extracted out of the video signal. In the decoder 18, the data is decoded into the picture numbers. The picture numbers are supplied to the coincidence detection circuit 19. The coincidence detection circuit 19 includes a register for storing target picture numbers supplied from the data memory 115, a register for storing reproduced picture numbers obtained from the video disk 1, and a coincidence circuit. The coincidence circuit monitors the coincidence of the values of both the registers, and compares the target picture numbers and the reproduced picture numbers with each other so that when both the compared numbers coincide, the coincidence detection circuit 19 sends out a writing command signal for a time corresponding to one field or one frame (depending on whether a video memory 8 is a field memory or a frame memory). When the writing command signal is no longer being issued, the value of the register for storing the target picture numbers is cleared. The writing command signal is supplied to the video memory 8 and the system control circuit 117 through a mode switch 123 when the switch is set to contact S. Video information is written in the video memory 8 while the writing command signal is supplied thereto. When the writing command signal has ceased being issued, the system control circuit 117 controls the servo mechanism 120 to newly search out a prescribed position, preferably the position of the beginning of a program corresponding to the previously entered program number, and to thereafter start the normal reproduction of the program from the beginning thereof. When the mode switch 123 is shifted to contact N, the audio still picture reproducer is put in the same reproduction mode as the audio still picture reproducer shown in FIG. 1. When the mode switch 123 is shifted to the contact S, the audio still picture reproducer is put in a special reproduction mode based on the present invention.

Next, the reproduction operation of the audio still picture reproducer of FIG. 4 will be described. An optional number of picture numbers corresponding to desired pictures are first entered through the input section 116. In the data memory 115, the entered picture numbers are stored at positions allocated to programs to which the desired pictures belong, respectively. The mode switch 123 is then shifted to the contact S and reproduction of the disk 1 is started. With the switch 123 in this position, the number of each program desired to be reproduced is entered through the input section 116. When a program search command is thereafter given through the input section 116, the storage address present in the data memory 115 and corresponding to the number of the program desired to be reproduced is deciphered by the decoder 118 so that a target picture number stored at the storage address is supplied to the system control circuit 117 and the coincidence detection circuit 19. The system control circuit 117 then controls the servo mechanism 120 to search out the recorded position of video information corresponding to the target picture number and thereafter start the reproduction from the recorded position. At that time, a reproduced picture number (obtained from video information that has been read) is coincident with the target picture number supplied from the data memory 115. When the coincidence is detected by the coincidence detection circuit 19, the writing command signal is sent out from the coincidence detection circuit so that video information whose contents (one field or one frame) correspond to the target picture number is written in the video memory 8. After that, the video information written in the video memory 8, is repeatedly read therefrom and sent out as reproduced video information so that a still picture is continuously displayed on monitor 13. Before the video information is written in the video memory 8, it is inhibited by a squelch circuit (not shown in the drawings) to perform displaying on the monitor 13.

When the writing command signal ceases to be sent out from the coincidence detection circuit 19, namely, when the writing of the video information in the video memory 8 is completed, the system control circuit 117 controls the servo mechanism 120 to search out the position of the beginning of another program corresponding to another program number which has been previously entered, and to start the normal reproduction of the program from the beginning thereof. As a result, audio information read from the video disk 1 is demodulated by an audio demodulation circuit 5 and sequentially supplied as reproduced audio information to a loudspeaker 14 so that the audio information is normally reproduced. From the beginning of the program to the start of the reproduction, it is inhibited by a squelch circuit (not shown in the drawings) to supply the audio information to the loudspeaker 14. On the other hand, the video information read from the video disk 1 is demodulated by the video demodulation circuit 7 and sequentially supplied to the video memory 8. Since the writing command signal is not supplied to the video memory 8, the video information is not written therein, so that reproduction of the still picture is continued. Since the value of the target picture number stored in the register of the coincidence detection circuit 19 is cleared when the writing command signal ceases to be sent out from the coincidence detection circuit, the above-described processing operation is not repeated even if the information reading point of the pickup 3 comes to a still picture reproduction position again during the reproduction of the information on the video disk 1.

The above-described series of operations is repeated at each time of a search of a desired program so that if the program corresponds to a tune, for example, the tune can be normally listened to from the beginning to the end thereof with a desired picture continuously displayed as a still picture during the period of the reproduction of the program.

Although the picture numbers corresponding to the desired pictures are entered by number through the input section 116 out of the series of picture numbers attached to the video disk 1 to be reproduced and are stored in the data memory 15 in the audio still picture reproducer shown in FIG. 4, the most preferable procedure of storing the target picture numbers in the data memory is that a viewer gives a storage command at the time of reproduction of every desired picture while watching a moving picture displayed on the monitor 13 as the video disk is reproduced before reproducing the information in still picture format, to sequentially store the picture numbers included in corresponding video information.

Figure 5:
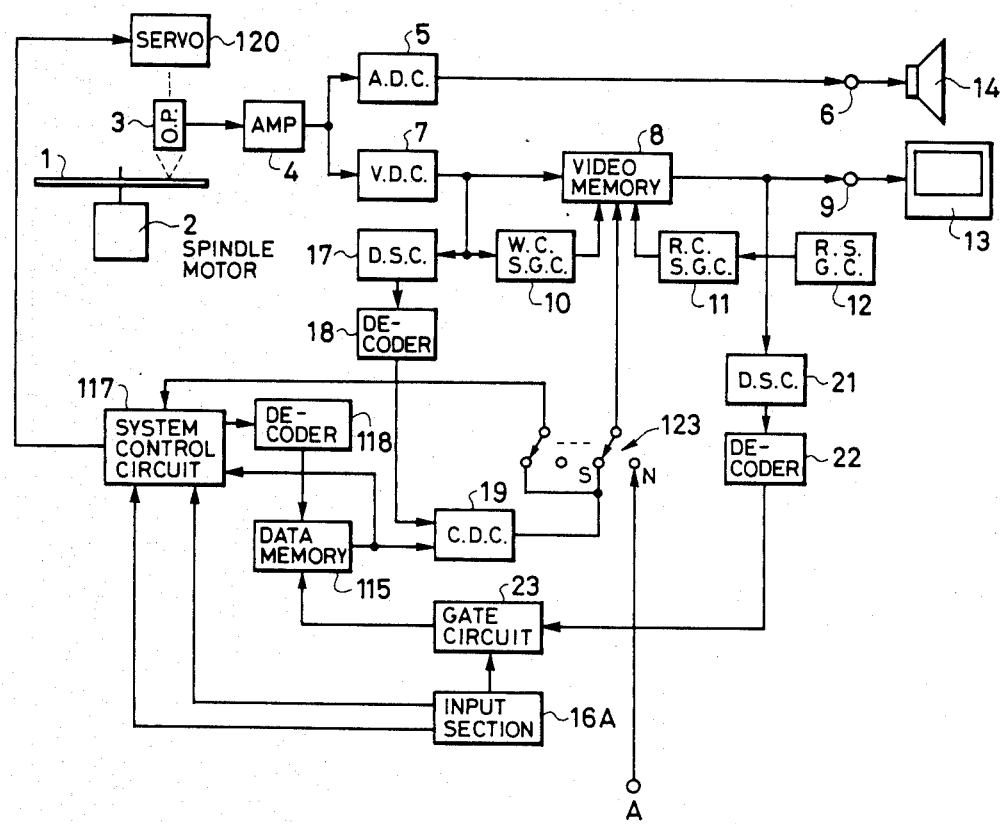
FIG. 5 shows a block diagram of an audio still picture reproducer according to a fourth embodiment of the present invention.

FIG. 5 shows a block diagram of an audio still picture reproducer according to a fifth embodiment of the present invention. In the fifth embodiment, the above-mentioned most preferable procedure is applied. The mutually corresponding portions shown in FIGS. 3 and 5 are denoted by the same reference symbols therein.

The audio still picture reproducer includes a data separation circuit 21 in which data corresponding to a program number and a picture number are extracted out of a video signal sent out from video memory 8, decoder 22 for decoding the extracted data into the program number and the picture number, and gate circuit 23 which functions so that the program number and the picture number from the decoder 22 are supplied to data memory 115 in response to a storage command from input section 16A, in addition to the same components as those of the picture reproducer shown in FIG. 4. The data separation circuit 21 and the decoder 22 may be replaced (i.e. have their functions performed) by data separation circuit 17 and decoder 18, respectively, by additionally coupling the output from the decoder 18 into the gate circuit 23.

Next, the reproduction operation of this audio still picture reproducer will be described. Mode switch 123 is first shifted to contact N and normal reproduction is started. A moving picture is displayed on monitor 13. When a desired picture is displayed, the storage command is given through the input section 16A. As a result, the gate circuit 23 is turned on so that the number of the desired picture is supplied as a target picture number to the data memory 115. At the same time, the number of a program to which the desired picture belongs is also supplied to the data memory 115 so that in the data memory, the picture number is stored at a storage position allocated for that program. When another desired picture is displayed on the monitor 13, another storage command is given. An optional number of target picture numbers are thus stored at allocated storage positions in the data memory 115. At that time, either undesired pictures may be skipped by quick motion or the like to search out a desired picture, or a step-by-step reproduction mode or a still picture reproduction mode may be set to precisely search out a desired picture, to store a target picture number.

When the mode switch 123 is shifted to contact S after the storage of the target picture numbers so that the disk 1 is normally reproduced from the beginning thereof, special reproduction in which audio still pictures are sequentially displayed is performed.

In each of the audio still picture reproducers shown in FIGS. 4 and 5, although the picture numbers are stored in the data memory at the storage places allocated for their programs, the present invention is not confined thereto. The present invention may be otherwise constructed so that the program numbers and the picture numbers are collectively and randomly stored without allocation of storage positions such that in reproduction, collective data including a selected program number are supplied to the coincidence detection circuit and compared with reproduced collective data sent out from the decoder 18.

Although the data memory, the decoder 18, the coincidence detection circuit 19 and so forth are formed using hardware in the audio still picture reproducers shown in FIGS. 4 and 5, the data memory, the decoder, the coincidence detection circuit and so forth may be formed using a microcomputer together with the system control circuit to perform processing in a software manner.

Although the above-described embodiments are made as video disk players, the invention may be made as a video tape recorder.

As described above, in the audio still picture reproducer of the present invention, picture numbers corresponding to desired ones of pictures which are to be reproduced from a recording medium are sequentially stored beforehand in a memory in accordance with the sequence of the reproduction of the desired pictures, and video information (read from the recording medium and corresponding to the picture numbers stored in the memory) is written in a video memory in accordance with the sequence of the storage of the picture numbers in the memory. Otherwise, the picture numbers corresponding to the desired ones of the pictures which are to be reproduced from the recording medium are stored beforehand in the memory in correspondence with programs to which the desired pictures belong, respectively, reproduced video information, corresponding to the picture number for the desired picture belonging to the selected program stored in the memory, is written in the video memory at the time of the selection of the program, and the reproduction is thereafter started from a prescribed position, preferably from the beginning of the program. The video information written in the video memory is sequentially and repeatedly read therefrom and supplied as reproduced video information. Audio information read from the recording medium is supplied as reproduced audio information as is. As a result, each desired picture can be continuously reproduced as a still picture along with sound and the desired still pictures can be sequentially reproduced with sound. A novel audio and video effect can thus be achieved.

What is claimed is:

1. A device for reproducing still pictures together with audio information from a recording medium, the recording medium having video information and the audio information stored thereon, the video information including series of pictures and a frame identification code associated with each picture for identifying its associated picture, the device comprising;
   (a) means for reading the audio information and the video information from said recording medium;
   (b) means for outputting the audio information read from said medium to an audio reproducing means;
   (c) a video memory for selectively storing pictures, one at a time;
   (d) means for sequentially designating a plurality of pictures stored in said recording medium by sequentially designating their associated frame identification codes;
   (e) means for comparing frame identification codes read from the recording medium with said sequentially designated frame identification codes and for generating a write command upon coincidence of a read frame identification code with a designated frame identification code;
   (f) writing control means responsive to a write command for writing in said memory the video signals corresponding to the picture associated with the frame identification code upon which coincidence was detected; and (g) means for repeatedly reading out the video signals written in said memory to produce a still picture of said video information.

2. A device according to claim 1, wherein said means for sequentially designating comprises mean for entering designated frame identification codes and storage means for storing the entered designated frame identification codes.

3. A device according to claim 2, wherein said storing means comprises means for storing a plurality of said designated frame identification codes in a sequence corresponding to the sequence in which the designated pictures are to be produced as still pictures, and for supplying the next stored designated frame identification codes to said comparing means in response to the coincidence between a designated frame identification code a read frame identification code.

4. A device according to claim 2, wherein said writing control means further comprises means for preventing further writing in said memory after a predetermined time interval and continuing until the next write command.

5. A device according to claim 2, wherein said means for entering designated frame identification codes comprises user acivated means for entering an input signal as motion video information is displayed on a display means and means responsive to said input signal for entering the frame identification code corresponding to the then displayed motion video information on said storage means.

6. A device according to claim 1, wherein said writing control means further comprises means for extracting the read frame identification codes, and supplying the extracted frame identification codes to said comparing means.

7. A device for reproducing still pictures together with audio information from a recording medium, the recording medium having video information and the audio information stored thereon, the video information having a plurality of programs thereon, each program containing sequential portions and a portion identification code associated with and identifying each portion, the device comprising:
(a) means for reading the audio information and video information from said recording medium.
(b) means for outputting the audio information read from said medium to a sound reproducing means;
(c) a video memory for selectively storing a particular one of desired sequential portions of the video information corresponding to a particular desired picture; and
(d) means for designating a plurality of portions to be sequentially reproduced according to their respective portion identification code.
(e) means for comparing each of the designated portion identification codes with the portion identification codes with the portion identification codes read from the recording medium and for generating a write command upon coincidence of a read portion identification code with a designated portion identification code
(d) writing control means responsive to said write command for writing in said memory the particular one of said designated portions of the video information read from the recording medium which corresponds to the read portion identification code coinciding with the designated portion identification code which produced the write command signal; and
(g) means for repeatedly reproducing the particular one of the desired sequential portions of the video information stored in said memory to produce a still picture thereof.

8. A device according to claim 7, further comprising reading control means for moving said means for reading to a designated position on said recording medium corresponding to a position in a designated program of the plurality of programs.

9. A device according to claim 8, further comprising input means for entering the portion identification codes corresponding to the desired sequential portions to be reproduced as still pictures, and for entering a desired program to be read, and means for storing each of the entered portion identification codes corresponding to the desired sequential portions with its corresponding program for entering a desired program to be read.

10. A device according to claim 9, wherein said means for storing stores the portion identification codes corresponding to desired sequential portions in prescribed addresses allocated to particular ones of the plurality of programs.

11. A device according to claim 9, wherein said means for storing stores the portion identification codes corresponding to desired sequential portions in correspondence with their respective programs.

12. A device according to claim 9, wherein said writing control means further comprises means for extracting the portion identification codes from the video information being read, and supplying the extracted portion identification codes to said comparing means.

13. A device according to claim 12, wherein said means for entering data comprises means, responsive to a user applied input signal as a motion video program is displayed on a display means for extracting the portion identification codes indicative of the sequential portions from the vide information being read during the application of said input signals, and for entering into said means for storing, as the designated portion identification codes, the sequential portions being read during application of said input signals.

14. A device according to claim 9, wherein said comparing means issues a write command when the portion identification codes which are being read coincides with one of the portion identification codes corresponding to the desired portions, which is supplying from said means for storing, and wherein said means for storing supplies a next one of the portion identification codes corresponding to desired portions to said coincidence detecting means in response to the write command.

15. A device according to claim 14, wherein said reading control means is responsive to the write command.

16. A device according to claim 9, wherein said means for entering data comprises means, responsive to user applied input signals as a motion vide program is displayed on a display means for extracting the portion identification codes indicative of the sequential portions from the video information being read during application of said input signals, and for entering into said means for storing, as the designated identification codes, the portion identification codes corresponding to the sequential portions being read during application of said input signals.

17. A device according to claim 8, wherein the designated position is the beginning of the designated program.

* * * * *